United States Patent
Bamasag et al.

(10) Patent No.: US 10,063,374 B2
(45) Date of Patent: Aug. 28, 2018

(54) SYSTEM AND METHOD FOR CONTINUOUS AUTHENTICATION IN INTERNET OF THINGS

(71) Applicant: Massachusetts Institute of Technology, Cambridge, MA (US)

(72) Inventors: Omaimah Omar Bamasag, Jeddah (SA); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 103 days.

(21) Appl. No.: 15/130,083

(22) Filed: Apr. 15, 2016

(65) Prior Publication Data
US 2016/0352732 A1    Dec. 1, 2016

Related U.S. Application Data

(60) Provisional application No. 62/168,909, filed on May 31, 2015.

(51) Int. Cl.
*H04L 9/30* (2006.01)
*H04L 9/32* (2006.01)
(Continued)

(52) U.S. Cl.
CPC ............ *H04L 9/3066* (2013.01); *H04L 9/085* (2013.01); *H04L 9/3242* (2013.01); *H04W 4/70* (2018.02);
(Continued)

(58) Field of Classification Search
CPC .............................. H04L 9/3297; H04L 9/085
See application file for complete search history.

(56) References Cited

U.S. PATENT DOCUMENTS 7,200,752 B2    4/2007   Eskicioglu
9,264,404 B1*   2/2016   Lambert ............. H04L 63/0428
(Continued)

FOREIGN PATENT DOCUMENTS

JP          5368637 B1    12/2013

OTHER PUBLICATIONS

Kaiping Xue n, ChangshaMa,PeilinHong,RongDing , A temporal-credential-based mutual authentication and key agreement scheme for wireless sensor networks, 2012 Elsevier Ltd.*

*Primary Examiner* — James R Turchen
(74) *Attorney, Agent, or Firm* — Peter A. Nieves; Sheehan Phinney Bass & Green PA

(57) ABSTRACT

A system for continuous authentication of internet of things (IoT) devices in a communication network utilizes lightweight authentication for a sequence of message transmissions in a specific time-frame. A claimer device and a verifier device are in communication with the network. The claimer is configured to define a time frame and a time flag for an authentication session for a predetermined maximum number of messages, generate a time-bound share from a secret key, calculate a share authenticator for the share, combine a claimer identity (ID), a verifier ID, a message payload, the share, the share authenticator, a time flag, a timestamp, and message authenticator into a message, and send the message to the verifier within the time period. The verifier is configured to receive the message from the claimer, verify the message freshness, verify authenticity of the time flag and timestamp, and reveal and check the authenticity of the share.

12 Claims, 6 Drawing Sheets

(51) Int. Cl.
*H04L 9/08* (2006.01)
*H04W 12/06* (2009.01)
*H04W 4/70* (2018.01)

(52) U.S. Cl.
CPC ........... *H04W 12/06* (2013.01); *H04L 9/3297* (2013.01); *H04L 2209/805* (2013.01)

(56) References Cited

U.S. PATENT DOCUMENTS

| | | | |
|---|---|---|---|
| 2002/0087865 A1* | 7/2002 | Eskicioglu | H04L 9/085 713/180 |
| 2004/0107356 A1* | 6/2004 | Shamoon | H04L 63/0428 713/193 |
| 2007/0036353 A1 | 2/2007 | Reznik et al. | |
| 2007/0067618 A1* | 3/2007 | Sandhu | H04L 9/302 713/155 |
| 2007/0192836 A1* | 8/2007 | Shiran | H04L 9/321 726/4 |
| 2008/0013724 A1* | 1/2008 | Shamoon | H04L 63/0428 380/201 |
| 2009/0214028 A1* | 8/2009 | Schneider | H04L 9/0844 380/44 |
| 2014/0013110 A1* | 1/2014 | Thoniel | H04L 9/083 713/156 |
| 2014/0053241 A1 | 2/2014 | Norrman et al. | |
| 2015/0281199 A1* | 10/2015 | Sharma | H04L 63/08 713/168 |

* cited by examiner

SYSTEM AND METHOD FOR CONTINUOUS AUTHENTICATION IN INTERNET OF THINGS

CROSS-REFERENCE TO RELATED APPLICATIONS

This application claims the benefit of U.S. Provisional Patent Application Ser. No. 62/168,909, filed May 31, 2015, entitled "Towards Continuous Authentication in Internet of Things Based on Secret Sharing Scheme," which is incorporated by reference herein in its entirety.

FIELD OF THE INVENTION

The present invention relates to networking, and more particularly, is related to providing authentication and security for devices with low memory and/or processing capacity.

BACKGROUND OF THE INVENTION

In recent years, the Internet of Things (IoT) has developed rapidly and gained attention both in academia and industry. By connecting sensors, tiny smart devices and everyday physical objects with the Internet, IoT provides a new form of communication for people and devices, which makes the virtual information world integrated seamlessly with the real world. IoT applications may involve environment monitoring, e-health, electric vehicle, and the smart house, in which appliances and services that provide notifications, security, energy-saving, automation, telecommunication, computers and entertainment are integrated into a single ecosystem with a shared user interface. IoT Devices are characterized by limited memory and storage capacity and low computational capability. For example, MSP430 16-bit MCU by Texas Instruments, which is used in many IoT applications such as wearable healthcare monitoring, has central processing unit (CPU) speed of 25 MHz, up to 512 KB flash memory, and 66 KB RAM. These limited resources impose constrains on the operations to be implemented by these devices. As many applications of IoT devices are related to daily life of a user, privacy and security aspects are very important. However, the nature of the complex and heterogeneous structure of IoT makes security issues very challenging. In addition, most nodes are resource-limited, as explained above, and therefore, necessitate lightweight IoT security mechanisms. In this context, lightweight means that the security solution features a much lower number of operations, lower number of communication times between parties, and a lower computation and communication overhead for both parties. These characteristics are particularly important when large number of messages are transmitted/exchanged in a short time interval. An illustrative example is a remote user accessing a particular node of the IoT. It is desirable to authenticate the user and allow the user to gather data from that node and/or send commands to that node.

An authentication mechanism is considered to be a central element in addressing the security issue in the above scenario. Authentication can prevent unauthorized users from gaining access to resources, prevent legitimate users from accessing resources in an unauthorized manner, and enable legitimate users to access resources in an authorized manner. Mutual authentication is also desirable since all parties should be sure of the legitimacies of all the entities involved.

There is a need for a lightweight authentication solution for secure transmission of consecutive messages in IoT.

There are several security threats on IoT that the previous authentication solutions do not adequately address. In IoT, the possible communications are device to device, person to device and person to person giving connection between heterogeneous entities or networks.

Four categories of threats include:

T1. Man-in-the-Middle Attack: an active attacker can insert itself between the communicating parties, i.e. message sender (claimer) and message receiver (verifier), to gain access to the authentication protocol messages. Then the attacker can impersonate the verifier to the claimer while concurrently impersonating the claimer to the verifier. This may allow it to authenticate itself to both parties successfully.

T2. Eavesdropping attack: a passive attacker can listen to the communication channel in order to extract useful data from the information flow, i.e. secret keys.

T3. Denial of Service Attack: All the devices in IoT have limited computation and storage resources, thus they are vulnerable to resource exhaustion attack. Attackers can send messages or requests to specific device so as to consume their resources. For IoT, the attacker overwhelms the verifier with authentication requests.

T4. Replay Attack: an active attacker can capture authentication messages exchanged between a legitimate claimer and a verifier, and then replay them at a later time to be falsely authenticated as that claimer.

To establish an authenticated, secure, and continuous (time-bound) channel between two entities in IoT, it is desirable to meet the following security requirements:

S1. Message source authentication: The message receiver (verifier) should be able to authenticate the identity of the message sender (claimer), i.e. ensuring that the message was sent from the expected source. This addresses the Man-in-the-Middle attack T1.

S2. Continuous authentication: A secure transmission channel is to be set between both the communicating entities in a pre-determined time-frame. This allows performing the authentication handshake process conducted between entities only at the beginning of the communication session. Then, sender authentication is performed at any point in time during the communication session in a fast and efficient way, which is appealing in frequent message transmissions.

S3. Integrity of data ensures that the data has not been tampered with or changed while being transmitted over networks and stored by the entities.

S4. Confidentiality of the authentication key, i.e. the secret key S: Transmitting parts of the secret key, i.e. secret shares, should not reveal any information on the secret key itself.

S5. Access control: For this requirement, authentication plays a significant role in order to protect entities and resources against unauthorized access of internal and external entities. Fulfilling this requirement addresses the Denial-of-Service attack T3.

S7. Freshness: is to ensure that the claimer has just sent the message to the verifier for the first time, i.e. it was not replayed. Fulfilling this requirement protects the protocol against the Replay attack T4.

In addition to the security issues listed above, some functional characteristics are desirable to be fulfilled as well, including:

F1. Efficiency: the authentication solution should be lightweight taking into account the computation, storage, and power limitations of many of IoT devices.

F2. Scalability: The increasing number of entities in IoT application should be accommodated in the solution with minimum effort.

Therefore, there is a need in the industry to address one or more of the above mentioned shortcomings.

SUMMARY OF THE INVENTION

Embodiments of the present invention provide a system and method for continuous authentication in the internet of things. Briefly described, the present invention is directed to a system for continuous authentication of internet of things (IoT) devices in a communication network that utilizes lightweight authentication for a sequence of message transmissions in a specific time-frame. A claimer IoT device and a verifier device are in communication with the network. The claimer is configured to define a time frame for an authentication session for a predetermined maximum number of messages; and for each message, it is configured to define a time flag, generate a time-bound share from a secret key, calculate a share authenticator for the share, combine a claimer identity (ID), a verifier identity (ID), a message payload, the share, the share authenticator, a time flag, a timestamp, and message authenticator into a message, and send the message to the verifier within the time period. The verifier is configured to receive the message from the claimer, verify the message freshness, verify authenticity of the time flag and timestamp, and reveal and check the authenticity of the share.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
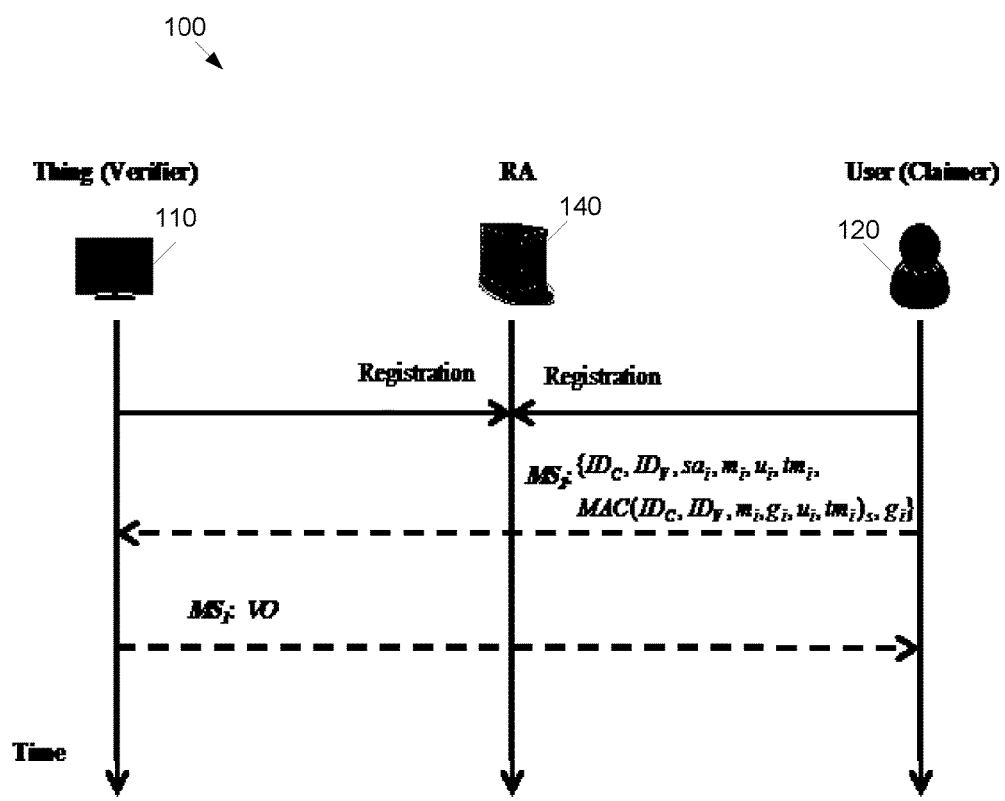
FIG. 1 is a diagram showing an overview of a first exemplary continuous authentication protocol.

The following definitions are useful for interpreting terms applied to features of the embodiments disclosed herein, and are meant only to define elements within the disclosure.

As used within this disclosure, "Internet of Things (IoT)" generally refers to networkable devices that may be relatively limited in terms of communication bandwidth, processing capacity, and/or memory, in comparison with a general purpose computer. Categories of IoT devices, in order of vulnerability to cyber attacks (such as data loss, malware, sabotage), may include passive identification devices (such as RFID tags), sensors with transmitting capability (such as pressure sensors), device controllers accepting remote commands (such as HVAC systems), and complex networked smart autonomous systems/devices (such as a smart car). Applications for IoTs include wearable and/or implanted devices, such as watches, pacemakers and insulin pumps, autonomous vehicles, such as drones or driverless cars, and robotic devices and/or appliances, such as a vacuum robot.

As used within this disclosure, a "message" generally refers to a network packet having a header and a payload. The header may contain information used for routing and verifying the authenticity of the message, while the payload, or "body" of the message may generally be regarded as the content of the message for use by the recipient of the message.

Reference will now be made in detail to embodiments of the present invention, examples of which are illustrated in the accompanying drawings. Wherever possible, the same reference numbers are used in the drawings and the description to refer to the same or like parts.

There is a need for the continuity of the secure channel in IoT. Continuity in this context refers to establishing a secure transmission channel for a pre-defined period of time, i.e. session, to transmit certain number of messages. Continuity complements the initial authentication and is necessary to guarantee that the sender, who was identified and authenticated in the beginning of a session, is the same throughout the session. Such authentication is referred to herein as "continuous authentication."

As stated in the Background section, there is a need for a lightweight authentication solution for secure transmission of consecutive messages in IoT. That is, establishing a secure transmission channel for a pre-defined period of time, i.e. session, to transmit certain number of messages between a Claimer and a Verifier. The Claimer is an entity that wishes to send consecutive messages, to the Verifier. The Verifier needs to verify the source and the integrity of the received messages before executing them. This guarantees that the Claimer, who will be identified and authenticated in the beginning of a session, is the same throughout the session.

The embodiments of systems and method for continuous authentication of the secure channel described below incorporate fast and simple authentication for frequent message transmission in short time-intervals. Maintaining a low-cost authenticated communication channel is important in IoT applications that require frequent message transmissions, e.g. broadcasting control messages in a Smart Grid. Previous authentication solutions do not provide continuous authentication for the IoT. While earlier solutions may address the initial (handshake) phase in which the involved parties submit their credentials, upon positive verification, the parties are authenticated and the communication proceeds. However, this 'one-time' process is performed every time the parties need to communicate, which results in computation and communication overhead on both sides. This issue is critical especially when a large number of messages need to be transmitted/exchanged in a short time interval, as explained in the previous paragraph. Embodiments of the present system and method provide solutions to address the continuous authentication issue in IoT.

There are multiple aspects of the present system and method, two of which are described hereinafter. First the authentication tokens are secret shares, e.g. portions, of a secret key agreed upon between the involved parties in the initial authentication phase. Therefore, instead of sending the identity proofing credentials, e.g. public key certificate and a signed message, the sender sends these shares consecutively, i.e. a single share accompanies a message, to the verifier who is able to link the share with the original secret key, hence authenticate the claimer. These authentication tokens are freshly generated for each session from a long-term secret known by both the Claimer and the Verifier. This adds another level of security and efficiency to the solution as of minimizing the need to renew the long-term secret.

Second, the present system and method introduces the notion of 'time' such that the authentication factors, i.e. tokens, are employed as a function of time changing in relation to time slots that agreed upon in advance between the claimer and the verifier. A single function outcome reveals a portion of data to the verifier so that it may be assured of the claimer identity. This leads to a 'continuity' concept in a sense that the secure transmission channel may be set between both entities by releasing time-bound variables generated by the claimer and can be verified by the verifier in a pre-determined timeframe. This enables claimer authentication in any point in time in a fast and efficient way, which is very appealing in frequent message transmissions in the IoT environment.

The following architecture for the IoT is used to illustrate the embodiments. 'Things' are end nodes in the IoT environment. They have unique Identifiers, i.e. IP address, and are able to communicate with each other over the Internet. In order to manage large number of resources, every 'thing' is pre-registered on a nearby trustworthy gateway (denoted as registration authority (RA)). RA is able to store entities' public key certificates, securely generate and distribute secret keys and maintain a history record of all access requests for auditing purpose.

In the architecture, a claimer is an entity that wishes to send consecutive messages to a Thing. For example, in a smart grid environment, a claimer may be a user who wants to send appliance control messages to his home appliances. A home appliance, verifier, needs to verify the source and the integrity of the received command messages before executing them.

The continuous authentication protocol incorporates secret sharing and time-bound aspects. The secret sharing scheme generates shares of the secret key s and distributes them to n shareholders, representing messages in the protocol. When an authorized number r of shareholders collaborate together, they can retrieve the secret key. The scheme is (r, n) threshold where any r number of users can collaborate to recover the secret key out of n users. This scheme is based on polynomial interpolation over a finite field. It uses the fact that a polynomial of degree r−1 may be constructed only if r data points are given. That is, given r points in the 2-dimensional plane $(x_i, y_i), \ldots, (x_r, y_r)$, with distinct $x_i$'s, there is one and only one polynomial $P(x)$ of degree r−1 such that $P(x_i)=y_i$ for all i.

The present embodiments employ the (r, n) secret sharing scheme for continuous authentication. Traditionally, the (r, n) secret sharing scheme is used to secure the secret key by distributing its shares to n entities. The present embodiments use the secret sharing scheme differently as the shares are used as authenticating token to authenticate the claimer (the secret shares generator) to the recipient (verifier) in a pre-defined time-frame. That is, the verifier is able to link the received share to its original secret key, thus authenticating the claimer (share generator) without the need to perform costly public/private key cryptography operations. This is performed in a pre-defined time-frame during which the claimer sends the shares accompanying the required messages to the verifier, hence achieving fast and efficient continuous authentication. These authentication tokens are freshly generated for each session from a long-term secret known by both the Claimer and the Verifier. This adds another level of security and efficiency to the solution as it minimizes the need to renew the long-term secret. In addition, these shares are valid only during the session and thus help in providing secure authentication across sessions.

In addition, the continuous authentication employs a 'time-bound' feature. In the added 'time-bound' feature, each share is tied with a time. That is, the share can only be revealed when the time it ties to is reached. This approach enables the realization of the 'continuity' in authentication as each time-bound share reveals portion of the secret key (authenticator key). This, in turn, enables the verifier to authenticate the claimer at any point in time during the session time-frame.

For exemplary purposes, the following assumptions are used in describing the exemplary embodiments here. (it should be noted that the present invention is not intended to be limited by this exemplary embodiment):

Both the claimer and the verifier have communicated with RA to register their IDs, public key certificate (if required), and received the secret key s through a secure communication channel.

Both the claimer and the verifier stores s securely to be used as a base for the continuous authentication protocol.

Both the claimer and the verifier agree on a time-frame T during which a series of messages $M=\{m_l, \ldots m_k\}$, k is the maximum number of messages, are to be sent from the claimer to the verifier, which need to be authenticated in a timely manner.

Table 1 shows the notation used to describe the embodiments herein.

TABLE 1

| Notation | Definition |
| --- | --- |
| H(m) | One-way collision free hash function, e.g. SHA-256. |
| MAC(m) | One-way MAC (Message Authentication Code) function executed on a message m using secret key s. |
| T | Time period agreed upon by both the claimer and the verifier for the session during which the continuous authentication takes place |
| $t_i$ | Positive integer denoting point in time frame T, i.e. timeslot, associated with message $m_i$. |
| s | Secret key chosen randomly from a finite group $Z_p$, P is prime, that both the claimer and the verifier store securely. |
| $u_i$ | time-bound secret share that the claimer generates from the secret key s and sends to the verifier. |
| $g_i$: | Positive integer denoting time flag during T that is bound to secret share $u_i$ such that the share $u_i$ is only revealed to the verifier at time point $t_i$. |
| $tm_i$ | Timestamp of the current time read from the timing control of the claimer to be incorporated in the message. |
| $ID_x$ | Unique identity associated with entity x, ie. $ID_C$ is the identity of the claimer and $ID_V$ is that of the verifier. |

TABLE 1-continued

| Notation | Definition |
|---|---|
| VO | Verification outcome holding a flag value indicating the outcome of each verification step. |

The first exemplary embodiment includes three main steps: Initialization, Message Authentication Initiation, and Authentication Verification. Following is a detailed explanation of these steps. An overview of the protocol is shown in FIG. 1. As illustrated with system 100 where a verifier 110 and a claimer 120 are in communication with an RA 140 via a communication network. The verifier 110 and/or claimer 120 may be implemented as a network element including a computer, as is described later.

Figure 2:
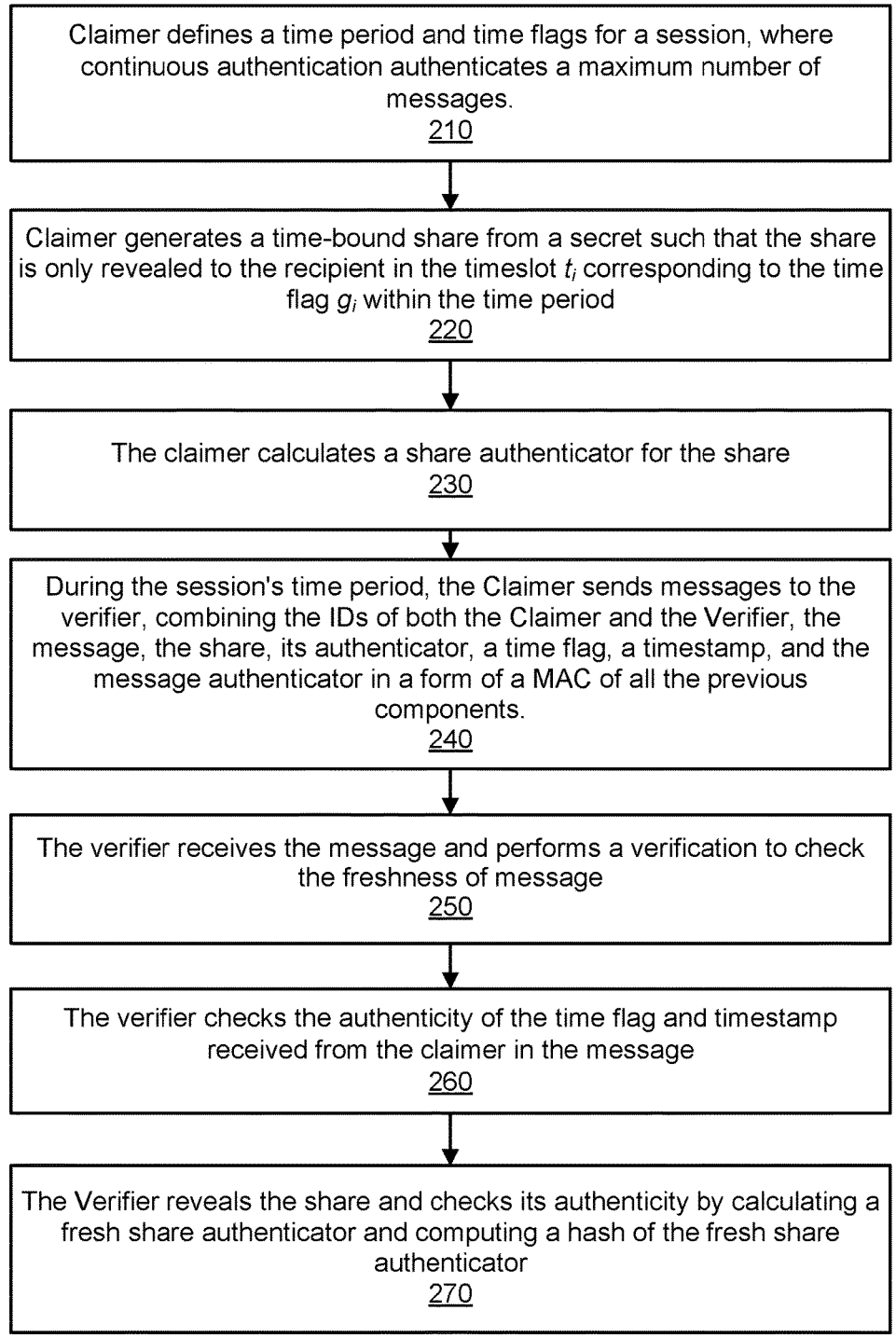
FIG. 2 is a flowchart of a first embodiment method of exchanging secure messages with an IoT device.

FIG. 2 is a flowchart for continuous authentication under the first embodiment. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

1) As shown by block 210, a claimer 120 defines the time frame T for a session, where continuous authentication takes place to authenticate a maximum of k number of messages, $T=\{t_1, \ldots, t_k\}$, where $1 \le i \le k$, is a timeslot associated with sending a message $m_i$. The claimer 120 also defines time flags $G=(g_1, \ldots, g_k)$, an integer number, such that time flag $g_i$ is associated with each timeslot $t_i$ so that the corresponding share $u_i$ (defined below) is only revealed to the verifier in timeslot $t_i$.

2) As shown by block 220, the claimer 120 generates time-bound shares $u_i$ for s such that share $u_i$ is only revealed to the recipient in timeslot $t_i$ corresponding to the time flag $g_i$ within the time period. Coefficients $a_i$ are chosen randomly from the finite group $Z_P$ (see Table 1).

$$u_i = f(x) = \sum_{i=1}^{k} a_i x^i + (s + g_i), x \in [1, k] \quad \text{(Eq. 1)}$$

New coefficients $a_i$ may be generated randomly for each session, for example, by a random number generator (not shown). Generating new coefficients for each session makes the shares unique for that session, i.e. different from the previous and the following sessions. This adds a new layer of security to the protocol as it minimizes the need to renew the secret key itself.

3) As shown by block 230, for each share $u_i$, the claimer calculates a share authenticator $sa_i$ $$sa_i = H\left(\sum_{i=1}^{k} a_i x_i\right) \quad \text{(Eq. 2)}$$

As shown by block 240, During the time frame T, the claimer sends messages $M=\{m_1, \ldots m_k\}$ to the verifier as follows:

4) For message $m_i$, the claimer sends a payload of the message combined with the share $u_i$, its authenticator $sa_i$, the time flag $g_i$, a timestamp $tm_i$, and message authenticator $MAC(m_i, g_i, u_i, tm_i)_s$. The claimer employs the secret key s in the MAC generation process to ensure that it has been generated by the claimer itself. The claimer then sends the whole message, containing the above mentioned parts, to the verifier as follows:

$MS_1 \cdot C \rightarrow V$:

$\{ID_C, ID_V, sa_i, m_i, u_i, tm_i)_s, g_i\}$

Verification V-1: As shown by block 250, the verifier checks the freshness of message $MS_1$ by performing the following verification:

a) Compare the timestamp $tm_i$ in $MS_1$ with the current time from the verifier's timing control unit. The verifier accepts the message if the difference between the two times is within a margin agreed upon in advance between the two parties, i.e. few seconds. If the outcome of this check is negative, the verifier sets a verification outcome (VO) VO='tm-neg', sends the VO to the claimer in message $MS_2$ and terminates the protocol; otherwise, the verifier proceeds to the next step.

b) Check the freshness of the share $u_i$, i.e. it has been received from the claimer for the first time. This is done by checking if it exists in the table of stored shares, i.e. previously sent by the claimer for the current session. If the check outcome is positive, the verifier sets VO='$u_i$-neg', sends it to the claimer in message $MS_2$ and terminates the protocol; otherwise, the verifier proceeds to the next step.

5) As shown by block 260, the verifier checks the authenticity of time flag $g_i$ and timestamp $tm_i$ (received from the claimer in message $MS_1$ by performing the following verification:

Compute a fresh MAC' of the message $m_i$, share $u_i$, time flag $g_i$, and timestamp $tm_i$ received from the verifier:
$MAC'=MAC(ID_C, ID_V, m_i, g_i, u_i, tm_i)_s$.

If the MAC' value is equal to the received MAC in $MS_1$, then $g_i$, is genuine, i.e. as sent by the claimer and has not been changed in transit. If the check outcome is negative, then the verifier sets VO='MAC-neg', sends it to the claimer in message $MS_2$, and terminates the protocol; otherwise, the verifier proceeds to the next step.

6) As shown by step 270, the verifier reveals the share $u_i'$ $$u_i'=u_i-g_i \quad \text{(Eq. 3)},$$

and

7) Checks the authenticity of the share $u_i'$, to determine if it belongs to the secret key s, by performing the following verification:

a) Calculating fresh share authenticator $sa_i'$ from the revealed share $u_i$ and the secret key s:

$$sa_i'=u_i-s \quad \text{(Eq. 4)},$$

and b) Computing a hash of the freshly calculated share authenticator $sa_i'$ and checking that the hash is equal to the share authenticator $sa_i$ received in $MS_1$:

$$sa_i'=H(sa_i') \quad \text{(Eq. 5)}$$

If the outcome of this check is negative, the verifier sets VO='sa-neg', and sends it to the claimer in message $MS_2$, and terminates the protocol. The outcome being positive proves that the share $u_i$ is associated with the secret key s.

Once Step 3 is completed, the verifier is assured that the message $m_i$ was sent from the legitimate claimer with identity $ID_C$ to the verifier with identity $ID_V$. The verifier sets VO='positive', and sends it to the claimer in message $MS_2$:

$MS_2 \cdot V \rightarrow C : VO$

This protocol is repeated for each message sent from the claimer to the verifier during the session time T. It enables the claimer to establish an authenticated transmission channel with the verifier so the claimer can send several messages with minimum authentication overhead in the predefined timeframe.

Figure 3:
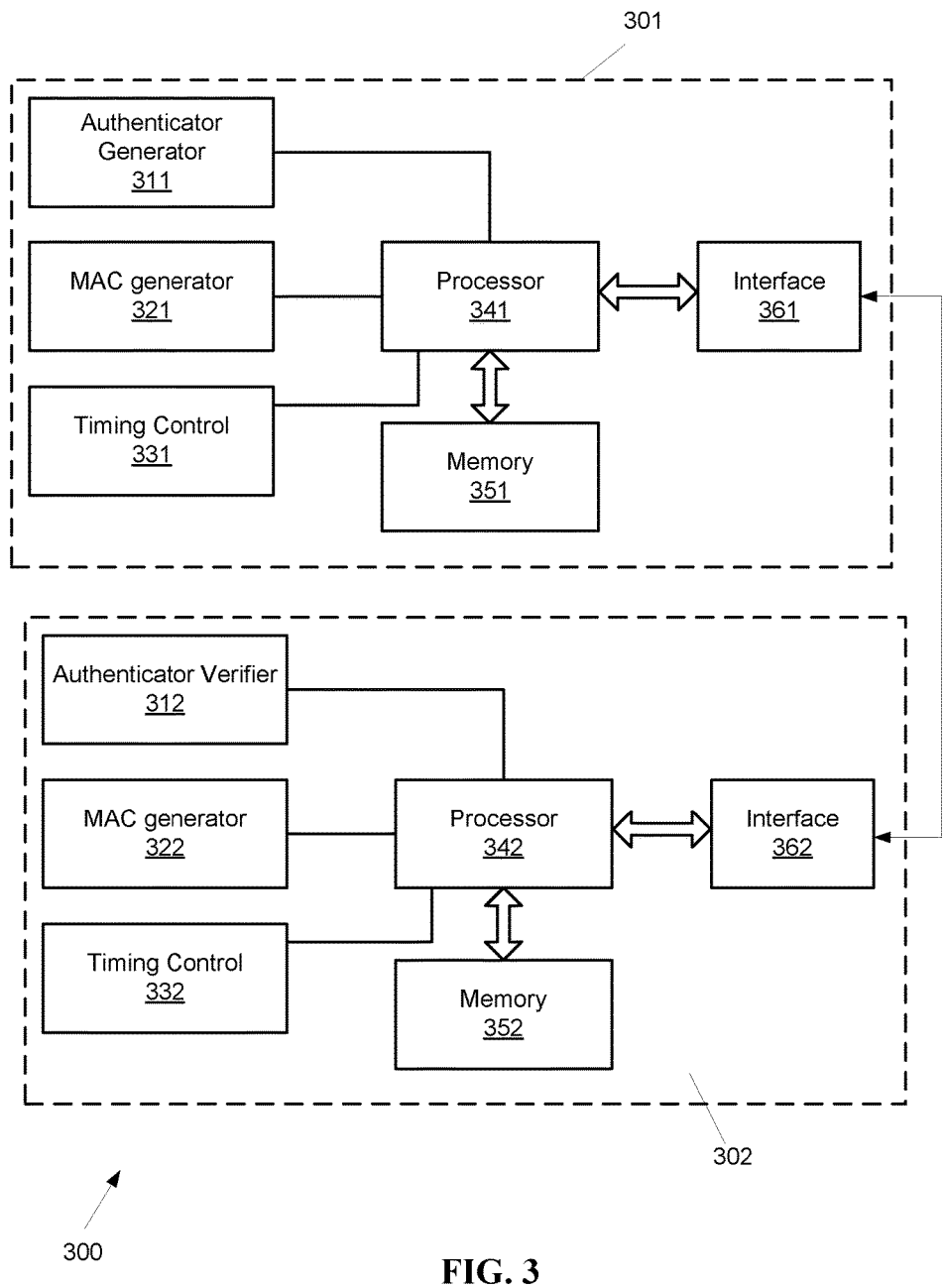
FIG. 3 is a schematic diagram of a claimer and a verifier.

FIG. 3 is a schematic diagram of a system 300 with a claimer 301 and a verifier 302. The claimer 301 includes a claimer authenticator generator unit 311, a claimer MAC (Message Authentication Code) generator unit 321, a claimer timing control unit, 331, a claimer processor 341 and claimer memory 351, and a claimer communications interface unit 361. It should be noted that the claimer processor 314 and/or claimer memory 351 may have limited functionality and/or capacity in comparison with a general purpose computing device. The verifier 302 includes a verifier authenticator generator unit 312, a verifier MAC generator unit 322, a verifier timing control unit 332, a verifier processor 342 and verifier memory 352, and a verifier communications interface unit 362. The claimer communications interface unit 361 may be in communication with the verifier communications interface 362 via a network, for example, a wired or wireless communication network (not shown).

Below the previously described protocol methods are further described from the respective points of view of the claimer 301 and the verifier 302.

The claimer 301 of the first embodiment includes five main parts: the claimer authenticator generator unit 311, the claimer MAC generator unit 321, the claimer timing control unit 331, the claimer processor 341 interconnected with the claimer memory 351, and the claimer communications interface unit 361.

The claimer authenticator generator unit 311 is responsible for constructing the interpolation polynomial f(x) by first choosing the random coefficients $a_i$ from $Z_P$, generating the time flags $g_i$ and then calculating the time-bound shares $u_i$.

$$u_i = f(x) = \sum_{i=1}^{k-1} a_i x^i + (s + g_i), x \in [1, k] \quad \text{(Eq. 6)}$$

The claimer authenticator generator unit 311 also calculates a share authenticator $sa_i$ $$sa_i = H\left(\sum_{i=1}^{k-1} a_i x_i\right) \quad \text{(Eq. 7)}$$

The claimer MAC generator unit 321 is responsible for generating the MAC value of given parameters together with a corresponding secret key s.

The claimer timing control unit 331 is responsible for generating time-related parameters of the protocol. For example, the claimer timing control unit 331 may generate timeslots $t_i$ of a session period T assigned by the claimer, $T=(t_l, \ldots, t_k)$, $1 \leq i \leq k$, where k is the number of messages to be sent during T.

The claimer processor 341 and the claimer memory 351 are responsible for managing the protocol execution between the units in the claimer 301. The claimer communications interface unit 361 implements a communication channel between the claimer 301 and the other devices, for example, the verifier 302, through sending message $MS_1$ and receiving the response in $MS_2$.

Figure 4:
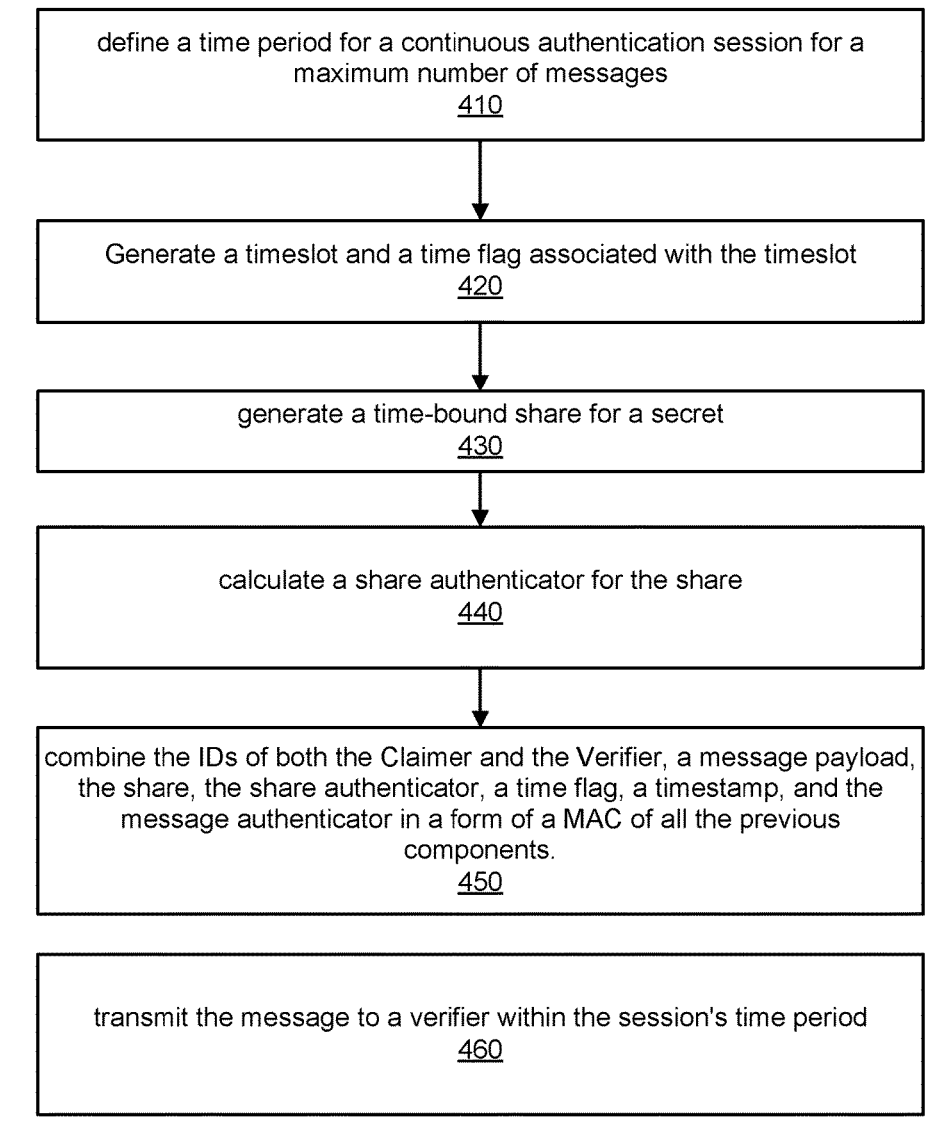
FIG. 4 is a flowchart of the first embodiment method of exchanging secure messages with an IoT device from the perspective of the claimer device.

FIG. 4 is a flowchart of the first embodiment method 400 of exchanging secure messages with an IoT device from the perspective of the claimer 301. The claimer 301 runs a claimer processor 341, which controls the protocol execution among other claimer units 311, 321, 331. Prior to running the protocol, the claimer 301 has obtained the secret key s from the registration authority RA, also provided to the verifier 302.

As shown by block 410, the claimer 301 defines the time frame T for the session, where the continuous authentication takes place to authenticate a maximum of k number of messages. As shown by block 420, the claimer timing control unit 331 handles generating one or more timeslots; $T=\{t_l, \ldots t_k\}$, where $t_i$, $1 \leq i \leq k$, is a timeslot associated with sending a message $m_i$. As shown by block 430, the claimer authenticator generator unit 311 generates time-bound shares $u_i$ for s such that the share $u_i$ is only revealed to the recipient in time $t_i$, as per Eq. 1). The claimer authenticator generator unit 311 also defines time flags $G=g_l, \ldots g_k$) such that time flag $g_i$ is associated with each timeslot $t_i$, as shown by block 440. For each share $u_i$, the claimer authenticator generator unit 311 calculates the share authenticator $sa_i$ as per Eq. 2.

The continuous authentication may be performed for each individual message sent from the claimer to the verifier, i.e. generating the message payload at the claimer and the verification process at the verifier. However, the shares generation, share authenticators generation, and time flags generation may be performed once at the beginning of the protocol execution for the multiple messages in the time period. This results in added security and efficiency as fresh shares are generated for each session from the same secret key s instead of renewing the secret key.

As shown by block 450, during the time frame T, the claimer 301 sends messages $M=\{m_l, \ldots m_k\}$ to the verifier 302 as follows: For the message $m_i$, the claimer 301 sends the message combined with the share $u_i$, its authenticator $sa_i$, the time flag $g_i$, a timestamp $tm_i$, and message authenticator $MAC(m_i, g_i, u_i, tm_i)_s$ generated by the claimer MAC Generator unit 321. The claimer MAC generator unit 321 employs the secret key s in message authenticator MACing process to ensure that it has been generated by the claimer 301 itself. As shown by block 460, the claimer 301 then sends the whole message, containing the above mentioned parts, to the verifier 302 through the claimer communications interface unit 361 as follows:

$MS_1 \cdot C \rightarrow V : \{ID_C, ID_V, sa_i, m_i, u_i, tm_i)_s, g_i\}$

The claimer 301 receives a response from the verifier 302 on the outcome of the authentication process through a response message $MS_2$. If the response is positive, then the authentication was successful and the protocol ends. Otherwise, if the response is negative, which means that one of the verification steps did not pass, then the claimer 301 retransmits the message again to the verifier 302. This is because the message could have been corrupted in transit in the first run.

Figure 5:
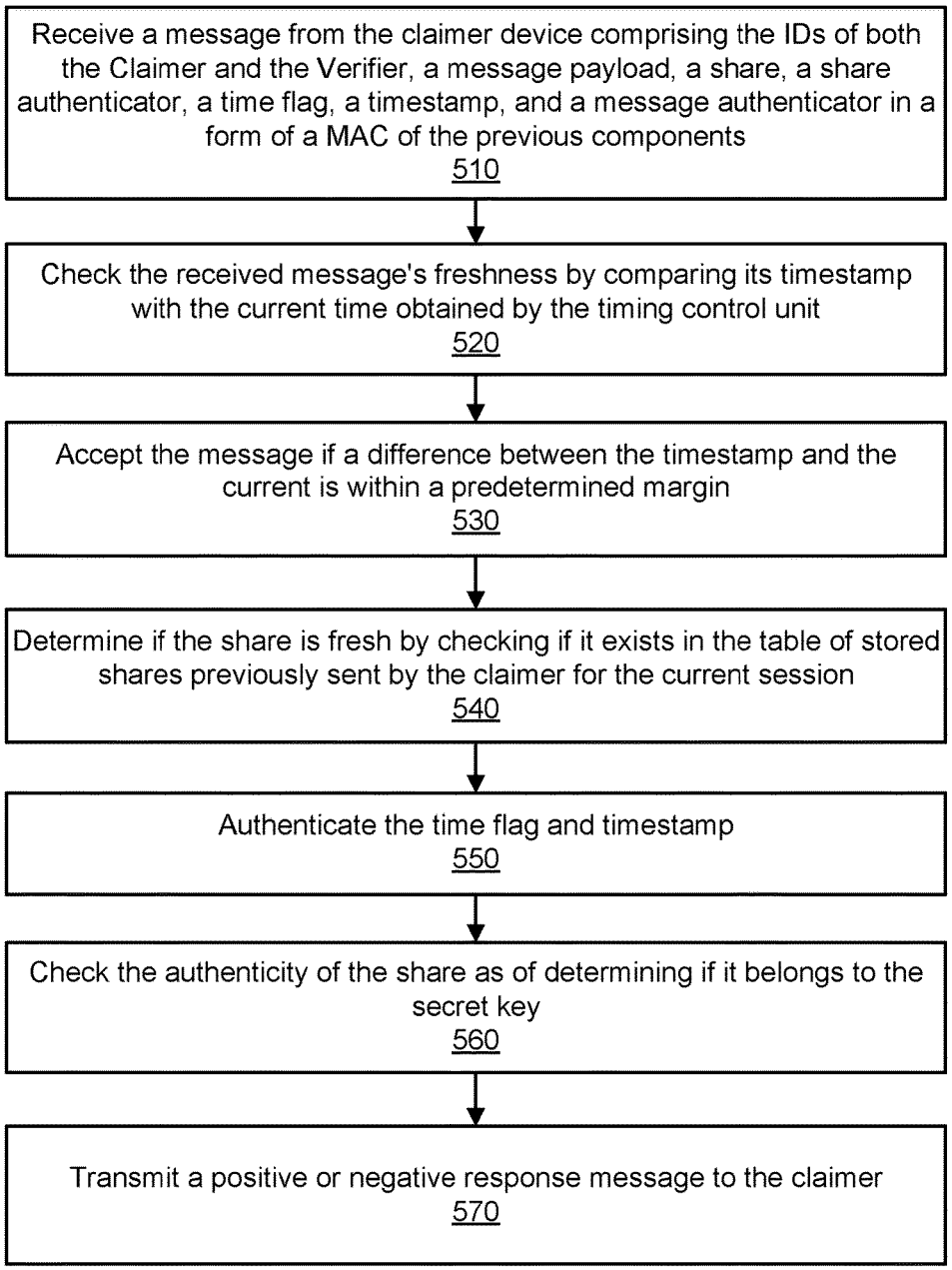
FIG. 5 is a flowchart of the first embodiment method of exchanging secure messages with an IoT device from the perspective of the verifier.

FIG. 5 is a flowchart of the first embodiment method 500 of exchanging secure messages with an IoT device from the perspective of the verifier 302. The verifier device 302 is integrated at the verifier side of the system 300. The verifier device includes five parts: the verifier authenticator generator unit 312, the verifier MAC generator unit 322, the verifier timing control unit 332, the verifier processor 342 interconnected with the verifier memory 352, and the verifier communications interface unit 362, in communication with the claimer communications interface unit 361.

Upon receiving a message $MS_1$ from the claimer 301 via the verifier communications interface unit 362 and the verifier processor 342, as shown by block 510, the verifier authenticator verifier unit 312 performs a verification.

The verifier authenticator verifier unit 312 compares a received timestamp $tm_i$ in $MS_1$ with the current time obtained from the claimer timing control unit 331, as shown by block 520. As shown by block 530, the verifier accepts the message if the difference between the two times is within a margin agreed upon in advance between the two parties, i.e. few seconds. If the outcome of this check is negative, the verifier 302 sets VO=tm−neg, sends VO to the claimer 301 in a response message $MS_2$ via the verifier communications interface unit 362, as shown by block 560 and terminates the protocol. Otherwise, the verifier 302 proceeds with the protocol.

The verifier 302 checks the freshness of the share $u_i$, as shown by block 540, by determining whether the share was received from the claimer for the first time. This is done by checking if it exists in the database of stored shares, i.e. previously sent by the claimer for the current session. If the check outcome is positive, the verifier sets VO=$u_i$−neg and send VO to the claimer 301 in the response message $MS_2$ via the verifier communications interface unit 362, as shown by block 560 and terminate the protocol. Otherwise, the verifier 302 proceeds with the protocol.

The verifier 302 checks the authenticity of time flag $g_i$ and timestamp $tm_i$ received from the claimer in message $MS_1$, as shown by block 550. The verifier MAC generator unit 322 computes a fresh MAC' of the message $m_i$, share $u_i$, time flag $g_i$, and timestamp $tm_i$ received from the claimer 301:

$$MAC'=MAC(ID_C,ID_V,m_i,g_i,u_i,tm_i)_s. \quad\quad (Eq. 8)$$

If MAC' equals the received MAC in $MS_1$, then $m_i$, $g_i$, $u_i$, $tm_i$ are genuine, i.e. as sent by the claimer 301 and have not been changed in transit. If the check outcome is negative, then the verifier sets VO='MAC−neg', and sends VO to the claimer 301 in the response message $MS_2$ via the verifier communications interface unit 362, as shown by block 570 and terminate the protocol. Otherwise, the verifier 302 proceeds with the protocol by checking the authenticity of the secret share $u_i$.

The verifier authenticator verifier unit 312 reveals the share $u_i'$:

$$u_i'=u_i-g_i \quad\quad (Eq. 9)$$

and checks the authenticity of the share $u_i'$, in particular, if the share belongs to the secret key s, by performing the following verification. The verifier authenticator verifier unit 312 calculates fresh share authenticator $sa_i'$ from the revealed share $u_i$ and the secret key s:

$$sa_i'=u_i-s \quad\quad (Eq. 10)$$

The verifier authenticator verifier unit 312 computes a hash of the freshly calculated share authenticator $sa_i'$ and checks that it is equal to the share authenticator $sa_i$ received in $MS_1$:

$$sa_i \stackrel{?}{=} H(sa_i') \quad\quad (Eq. 11)$$

If the outcome of this check is negative, the verifier 302 sets VO='sa−neg', and sends VO to the claimer 301 in the response message $MS_2$ via the verifier communications interface unit 362, as shown by block 560 and terminate the protocol. Otherwise, the verifier 302 proceeds with the protocol. The outcome being positive proves that the share $u_i$ is associated with the secret key s.

The verifier MAC generator unit 322 is responsible for generating the MAC value of given parameters together with a corresponding secret key s. The verifier timing control unit 332 is responsible for generating the time-related parameters of the protocol. At the verifier 302, the verifier timing control unit 332 reads the current time of the machine and sends the current time to the verifier authenticator verifier unit 312 via the verifier processor 342 upon request. The verifier authenticator verifier unit 312 is also responsible for verifying the authenticity of the secret share $u_i$.

The verifier processor 342 and verifier memory 352 units are responsible for managing the protocol execution between the units in the device. The verifier communications interface unit 362 represents the communication channel between the verifier 302 and the other devices, through receiving the message $MS_1$ and sending the response in $MS_2$ The verifier processor 342 of the verifier 302 controls the protocol execution among other units in the verifier 302. Prior to running the protocol, the verifier 302 obtains the secret key s from a registration authority RA, in a similar fashion as the claimer 301. The verifier 302 should have also obtained the timeframe T with its associated timeslots $t_i$ from the claimer 301.

The protocol starts when the verifier communications interface unit 362 receiving message $MS_1$ from the claimer 301. The verifier processor 342 forwards the message to the verifier authenticator verifier unit 312, which starts executing the steps described above. The outcome of the verification process, which is the message $MS_2$, is sent back to the claimer 301 via the verifier communications interface unit 362.

This protocol is repeated for each message sent from the claimer 301 to the verifier 302 during the session time T. The protocol enables the claimer 301 to establish an authenticated transmission channel with the verifier 302 where the claimer 301 can send several messages with minimum authentication overhead in the pre-defined time-frame. Embodiments of the current invention show improvement over previous methods in terms of computational cost, communication overhead, and storage requirements.

The constraints of IoT resource-limited devices were addressed in the embodiments described above, hence, the operations employed in the exemplary protocol embodiments are simple and lightweight as a complaint with this requirement. Fast and efficient hash and MAC functions are used, and expensive public key encryption is avoided. Table 3 shows the comparison between the embodiments and related work in terms of the number of times each operation is performed. The exemplary protocol embodiment is more efficient than the related work as it employs only MAC and Hash algorithms whereas the previous protocols use Elliptic curve cryptography and/or RSA cryptography. However, the embodiments execute random number generation k time. This is done once at the beginning of the protocol and performed on the stronger side of the communication link, i.e., claimer.

Examining energy requirements of a wide range of cryptographic algorithms that are used as building blocks in security protocols further highlights the efficiency of the embodiments, in terms of μJ/byte. The energy consumption of the hash and MAC algorithms, which are the only cryptographic algorithms employed in the embodiments, consumes the least energy of all listed algorithms.

TABLE 3

Performance comparison between the protocol of the current embodiment and related previous protocols

| | Phase | Hash | MAC | S-key encrypt | P-key encrypt | Rand. No. gen. | Multip. | Exp. | Add/subt |
|---|---|---|---|---|---|---|---|---|---|
| Protocol | Init. | 1 | 1 | — | — | K times (once) | k − 1 (once) | — | K + 2 (each snare) |
| | Verif. | 1 | 1 | — | — | — | — | — | 2 |
| IoT-Ellipic Curve 2012 | Init. | 1 | — | Comm. encrypted | 4 ECC | 2 | — | — | — |
| | Verif. | 1 | — | — | 2 ECC | 1 | — | — | — |
| Command & control- RSA 2014 | Sig. gen. | 1 | — | — | 1 | 2 (key gen) | 1 | 1 | — |
| | Sig. Verif | K | — | — | 1 | — | — | 1 | — |
| RFID- Elliptic Curve 2013 | Reader | 3 | — | — | 5 EEC | 3 | — | 1 | 2 |
| | Tag | — | — | — | 1 | — | — | — | 3 |

Communication costs refer to the number of the messages exchanged between the claimer and the verifier and also the size of each message in bytes. Storage costs refer to the memory requirements, in bytes, of the verifier side as it is the weakest point in the protocol in terms of resources. The message size has been calculated according to the size of the exemplary parameters and outputs of the system:

Hash-256: takes an input message of maximum size $2^{64}-1$ and produces a fixed length (256 bits) output.
MAC: 128 bits
Recommended key size:
 Symmetric: 128 bits
 ECC: key size 283 bits
 RSA 3072 bits
ID: may consider IPv6 address as an entity's ID: 128 bits
Timestamp: 64 bits
Secret key (and its shares): 128 bits.

TABLE 4

Comparison of Communication costs between the current embodiment and the most related work

| | Phase | No of msgs | Msg size | Storage (verifier) |
|---|---|---|---|---|
| Embodiment | Init. | 1 | 800 | 64 + k*128 |
| | Verif. | 1 | 8 bits | |
| IoT-Ellipic Curve 2012 [13] | Init | 1 | 667 bits | |
| | Verif. | 7 | 8/128/8/8/144 (ID + session key) | 539 |
| Command & control-RSA 2014 [20] | Sig. gen. | 1 | 2,304 bits | |
| | Verif. | | | 1,104 |
| RFID-Elliptic Curve 2013 [22] | reader | 2 | 40/512 | 384 |
| | tag | 2 | 128/128 | |

From Table 4, it can be seen that the embodiments indicate the least number of exchanged messages, one in each direction. The most notable saving is in the size of the message sent from the verifier to the claimer, which is only 8 bits, in comparison to the large size of multiple messages sent from the verifier in the related work. This is very desirable given the constraints of verifier devices. The storage costs are considered reasonable in comparison to those of the related work, given the computational efficiency of which the protocol of the embodiment outweighed them.

Figure 6:
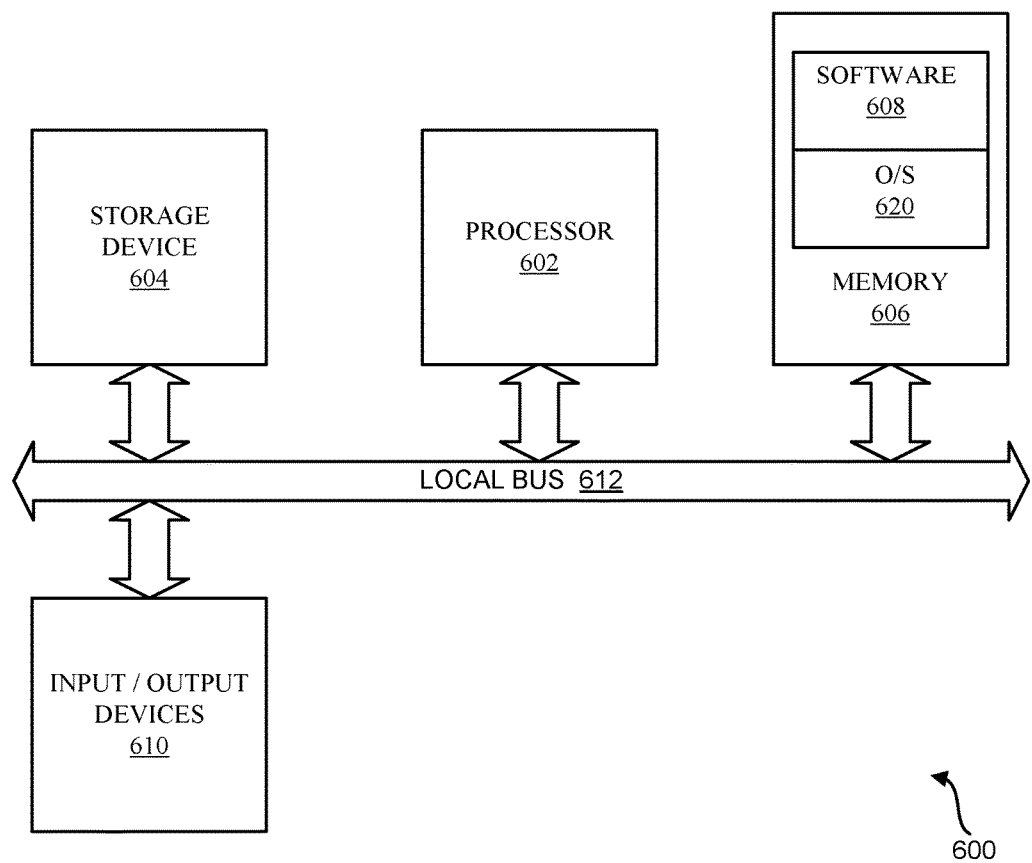
FIG. 6 is a schematic diagram illustrating an example of a system for executing functionality of the present invention.

As previously mentioned, the present system for executing the functionality described in detail above may be a special purpose, scaled down computer, an example of which is shown in the schematic diagram of FIG. 6. The system 600 contains a processor 602, a storage device 604, a memory 606 having software (or firmware) 608 stored therein that defines the abovementioned functionality, input and output (I/O) devices 610 (or peripherals), and a local bus, or local interface 612 allowing for communication within the system 600. The local interface 612 can be, for example but not limited to, one or more buses or other wired or wireless connections, as is known in the art. The local interface 612 may have additional elements, which are omitted for simplicity, such as controllers, buffers (caches), drivers, repeaters, and receivers, to enable communications. Further, the local interface 612 may include address, control, and/or data connections to enable appropriate communications among the aforementioned components.

The processor 602 is a hardware device for executing software, particularly that stored in the memory 606. The processor 602 can be a custom made or commercially available processor, a central processing unit (CPU), an auxiliary processor among several processors associated with the present system 600, a semiconductor based microprocessor (in the form of a microchip or chip set), a microprocessor, or generally any device for executing software instructions.

The memory 606 can include any one or combination of volatile memory elements (e.g., random access memory (RAM, such as DRAM, SRAM, SDRAM, etc.)) and non-volatile memory elements (e.g., ROM, hard drive, etc.). Moreover, the memory 606 may incorporate electronic, magnetic, optical, flash, and/or other types of storage media. Note that the memory 606 can have a distributed architecture, where various components are situated remotely from one another, but can be accessed by the processor 602.

The software/firmware 608 defines functionality performed by the system 600, in accordance with the present invention. The software/firmware 608 in the memory 606 may include one or more separate programs, each of which contains an ordered listing of executable instructions for implementing logical functions of the system 600, as described below. The memory 606 may contain an operating system (O/S) 620. The operating system essentially controls the execution of programs within the system 600 and provides scheduling, input-output control, file and data management, memory management, and communication control and related services.

The I/O devices 610 may include input devices, for example but not limited to, a sensor, microphone, etc.

Furthermore, the I/O devices 610 may also include output devices, for example but not limited to, a status indicator, display, etc. Finally, the I/O devices 610 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 600 is in operation, the processor 602 is configured to execute the software/firmware 608 stored within the memory 606, to communicate data to and from the memory 606, and to generally control operations of the system 600 pursuant to the software/firmware 608, as explained above.

When the functionality of the system 600 is in operation, the processor 602 is configured to execute the software 608 stored within the memory 606, to communicate data to and from the memory 606, and to generally control operations of the system 600 pursuant to the software/firmware 608. The operating system 620 is read by the processor 602, perhaps buffered within the processor 602, and then executed.

When the system 600 is implemented in software/firmware 608, it should be noted that instructions for implementing the system 600 can be stored on any computer-readable medium for use by or in connection with any computer-related device, system, or method. Such a computer-readable medium may, in some embodiments, correspond to either or both the memory 606 or the storage device 604. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 602 has been mentioned by way of example, such instruction execution system, apparatus, or device may, in some embodiments, be any IoT system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 600 is implemented in hardware, the system 600 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An Internet of things (IoT) claimer device in communication with a verifier device and a registration authority (RA) unit configured to communicate with the claimer and the verifier to register a unique identity for the claimer and the verifier, and to provide a secret key to the claimer and verifier, the claimer device comprising:
    a network interface configured to communicate with the verifier device; and
    a processor and a memory storing non-transitory instructions for execution by the processor, wherein the processor and memory have limited capacities in comparison with a general purpose computer, wherein the processor is configured to perform functionality of the following units:
        an authenticator generator unit configured to generate a time-bound share;
        a Message Authentication Code (MAC) generating unit; and
        a timing control unit configured to generate a timeslot;
    and the processor is further configured to perform a protocol comprising the following steps:
        defining a time period for a continuous authentication session for a predetermined maximum number of messages over the time period;
        calculating a time-bound share from the secret key;
        defining a time flag associated with the timeslot;
        calculating from the time-bound share a share authenticator for the share;
        combining a claimer identity (ID), a verifier identity (ID), a message payload, the share, the share authenticator, a time flag, a timestamp, and a message authenticator into a message; and
        transmitting the message to the verifier within the time period,
    wherein the continuous authentication session provides for authentication of multiple messages in the time period, and the time-bound shares are configured to change between authentication sessions and to be difficult to reproduce.

2. The claimer device of claim 1, further configured to perform the steps of: receiving a response message from the verifier indicating an outcome of a verifier authentication process selected from the group consisting of a positive response and a negative response; and
    ending the protocol if response message comprises a positive response; or
    retransmitting the message to the verifier within the time period if the response message comprises a negative response.

3. A verifier device in communication with an internet of things (IoT) claimer device and a registration authority (RA) configured to communicate with the claimer and the verifier to register a unique identity for the claimer and the verifier, and to provide the secret key to the claimer and verifier, the verifier device comprising:
a network interface configured to communicate with the claimer device; and
a processor and a memory storing non-transitory instructions for execution by the processor, wherein the processor is configured to perform functionality of the following units:
an authenticator verifier unit configured to verify an authenticity of a time flag, a timestamps, and a secret share;
generate a time-bound share;
a Message Authentication Code (MAC) generating unit; and
a timing control unit configured to generate time-related parameters;
and the processor is further configured to perform a continuous authentication protocol comprising the following steps:
receiving a message from the claimer device comprising a claimer identity (ID) a verifier identity (ID), a message payload, a share, a share authenticator, the time flag, the timestamp, a message authenticator;
comparing the timestamp with a current time obtained by the timing control unit;
accepting the message if a difference between the timestamp and the current is within a predetermined margin;
determining if the share is fresh;
authenticating the time flag, timestamp and secret share;
transmitting a response message to the claimer selected from the group consisting of a positive response and a negative response,
wherein the continuous authentication session provides for authentication of multiple messages in a time period, and the time-bound shares are configured to change between authentication sessions and to be difficult to reproduce.

4. The device of claim 3, further comprising the steps of:
computing, by the MAC generator, a fresh MAC' from the received share, share authenticator, time flag, timestamp; and
comparing the received MAC with the computed fresh MAC'.

5. The device of claim 4, wherein the response comprises the negative response if received MAC differs from the computed fresh MAC', otherwise the response comprises the positive response.

6. The device of claim 3, further comprising the steps of:
calculating a fresh share authenticator; and
authenticating the received share.

7. The device of claim 6, further comprising the steps of:
computing a hash of the fresh share authenticator; and
comparing the fresh share authenticator with the received share authenticator.

8. The device of claim 7, wherein the response comprises the negative response if the fresh share authenticator differs from the received authenticator, otherwise the response comprises the positive response.

9. A system for continuous authentication of internet of things (IoT) devices in a communication network utilizing lightweight authentication for a sequence of message transmissions in specific time-frame, comprising:
a claimer IoT device in communication with the network comprising a processor and a memory storing non-transitory instructions for execution by the processor, wherein the processor and memory have limited capacities in comparison with a general purpose computer;
a verifier device in communication with the network comprising a processor and a memory storing instructions for execution by the processor, wherein the processors of the verifier and claimer are configured to execute the instructions stored in their respective memories to perform the steps of:
by the claimer:
defining a time frame and a time flag for an authentication session for a predetermined maximum number of messages over a time period;
calculating a time-bound share from a secret key;
calculating from the time-bound share a share authenticator for the share;
combining a claimer identity (ID), a verifier ID, a message payload, the share, the share authenticator, a time flag, a timestamp, and message authenticator into a message; and
sending the message to the verifier within the time period;
by the verifier:
receiving the message from the claimer;
verifying the message freshness;
verifying authenticity of the time flag and timestamp; and
revealing and checking the authenticity of the share; and
a registration authority (RA) configured to communicate with the claimer and the verifier to register a unique identity for the claimer and the verifier, and to provide the secret key to the claimer and verifier;
wherein the share is only revealed to the verifier in the timeslot $t_i$, corresponding to the time flag $g_i$, within the time period, and the shares generation, share authenticators generation, time flags generation need only be performed once at the beginning of the protocol execution for the multiple messages in the time period, and time-bound shares are generated by the claimer, are configured to change between authentication sessions and to be difficult to reproduce.

10. The system of claim 9, wherein the verifier is further configured to respond to the message by communicating to the claimer by indicating whether or not the message was verified.

11. The system of claim 9, where in the RA is further configured to register a public key certificate of the claimer and/or the verifier.

12. The system of claim 9, wherein checking the authenticity of the share further comprises:
calculating a fresh share authenticator; and
computing a hash of the fresh share authenticator.

* * * * *